United States Patent [19]
Epstein et al.

[11] 3,792,314
[45] Feb. 12, 1974

[54] EMERGENCY LIGHT APPARATUS

[76] Inventors: J. Michael Epstein, 4730 Briarbend, Houston, Tex. 77035; Robert B. Sisson, 5406 Starling, Houston, Tex. 77015

[22] Filed: May 30, 1972

[21] Appl. No.: 257,855

[52] U.S. Cl. .............................................. 307/66
[51] Int. Cl. ............................................. H02j 9/00
[58] Field of Search ...... 307/64, 65, 66; 174/16 R, 174/17 UA, 52 R; 206/45.31, 45.34; 200/168 R

[56] References Cited
UNITED STATES PATENTS

| | | | |
|---|---|---|---|
| 2,909,587 | 11/1955 | Smedley | 307/66 |
| 3,324,304 | 6/1967 | Duncan | 307/66 |
| 3,111,219 | 11/1963 | Huey | 206/45.34 |
| 2,857,449 | 10/1958 | Akins | 174/16 R |

*Primary Examiner*—Herman J. Hohauser
*Attorney, Agent, or Firm*—Carl B. Fox, Jr.

[57] ABSTRACT

Emergency light apparatus including a sealed, non-corrosive housing for control elements and battery elements, and having fail-safe lighting elements mounted therein. The front of the housing transparent. Testing of the apparatus may be accomplished without opening of the housing, so that the internal components will remain protected.

6 Claims, 3 Drawing Figures

PATENTED FEB 12 1974 3,792,314

EMERGENCY LIGHT APPARATUS

SUMMARY OF THE INVENTION

The invention affords weatherproof, fail-safe emergency lighting apparatus. The lighting units are connected to a power source, and are energized by failure of the power source to give a period of operation while the power source is out of service. The battery elements are constantly maintained fully charged, so that in event of an emergency and dis-continuation of operation of the main power source, full time use of the emergency lighting apparatus will be available for use.

The sealed weatherproof housing used in connection with the apparatus is transparent at one side so that inspections of the internal apparatus may be made without removal of the cover. Furthermore, provision is made for testing the electrical components of the apparatus without removal of the cover to gain access to the internal components. The apparatus is of durable, corrosion proof construction so that it may be used in corrosive atmospheres such as aboard ship, in refinery and chemical plant locations, and any other locations where corrosion is likely to affect such an apparatus.

The batteries used in apparatuses of this character emit hydrogen gas, which can result in a fire hazard if the batteries are enclosed. In accordance with this invention, provision is made for adequate ventilation of the battery elements whereby hydrogen buildup is prevented.

The apparatus is designed for use under adverse conditions. The housing components, and the internal operating components disposed therein, are rugged and durable, so that use under abusive conditions will not result in damage and cause the apparatus to fail to operate when needed.

Other objects and advantages of the invention will appear from the following detailed description thereof, reference being made to the accompanying drawings.

DESCRIPTION OF THE PREFERRED EMBODIMENT

Figure 3:
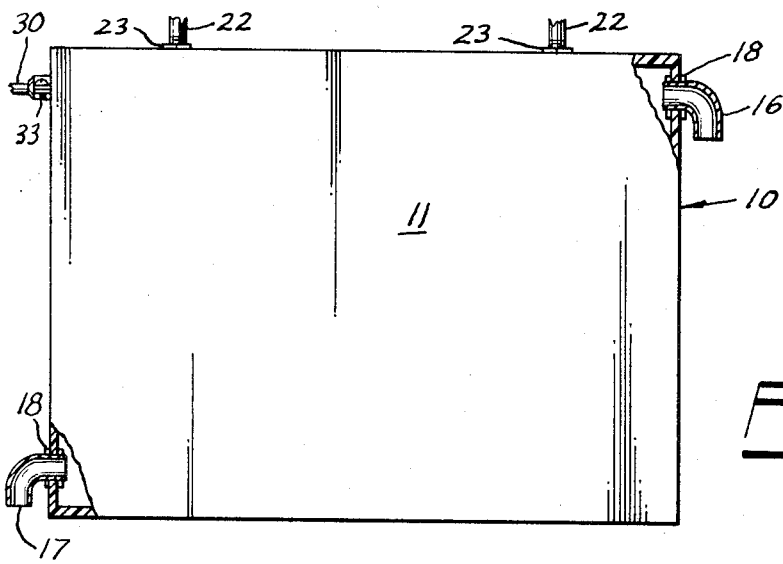
FIG. 3 is a rear elevation of the apparatus shown in FIGS. 1 and 2.
Figure 1:
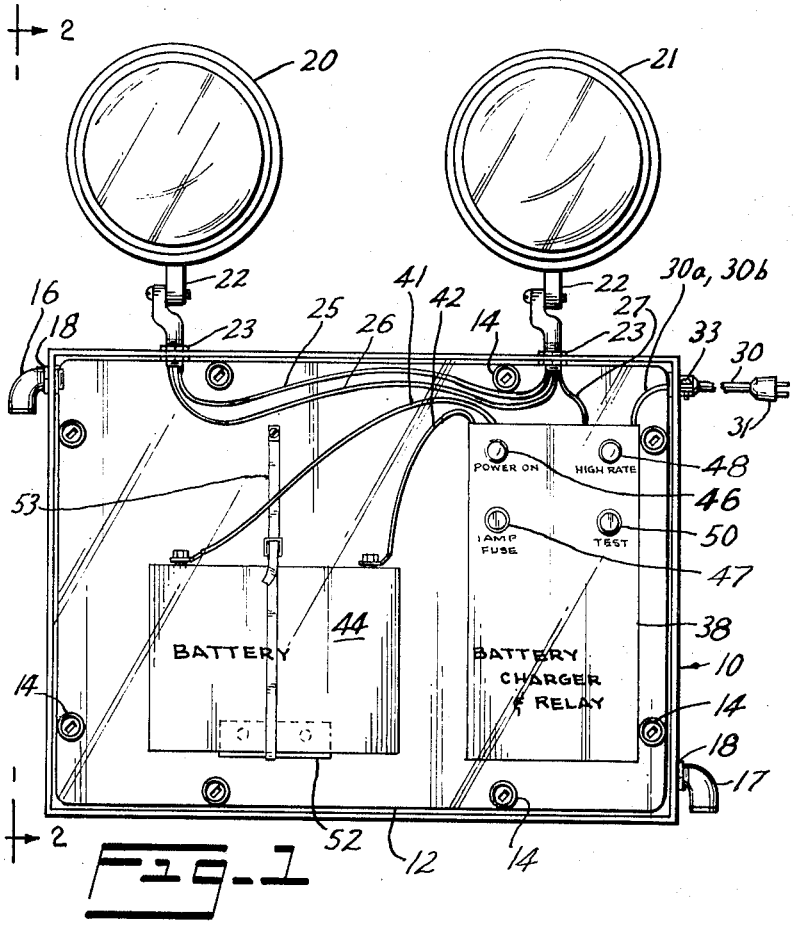
FIG. 1 is a front elevation of an apparatus of preferred form according to the invention.
Figure 2:
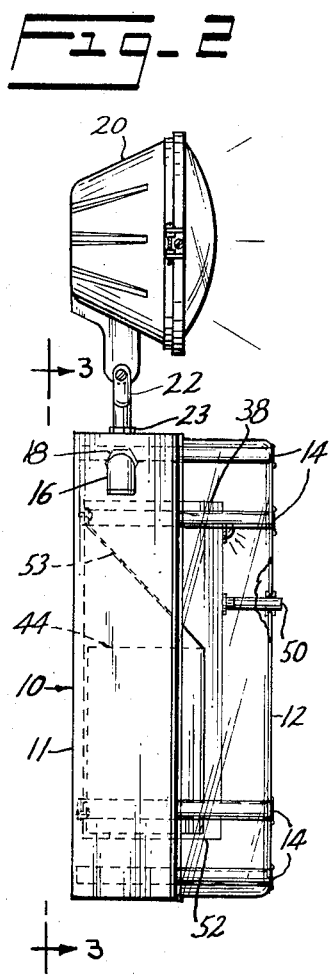
FIG. 2 is a left side elevation of the apparatus shown in FIG. 1.

Referring now to the drawings in detail, the apparatus includes the case or housing 10 which has a back part 11 and a front part 12. The back part of the housing is in the form of an opensided box having a back panel with perpendicular walls of equal width, formed of preferably opaque plastic material which is durable and reliable under both normal and abnormal atmospheric conditions. The front part of the housing or case is of opensided box form having a front panel with sides of equal width perpendicularly at one side, and made of transparent plastic material of a type also suitable for conditions of hard use. The transparent front part 12 of the housing permits viewing on a continuous basis of components of the apparatus disposed therewithin. The front part or cover 12 is attached to the back part 11 of the housing by a plurality of quick-turn screws 14 which pass through raised tubular formations at the interior of the walls of the housing part 12 and engage into receptacles built into raised tubular formations at the interior of the walls of housing part 11.

The back part 11 of the housing is preferably formed of a plastic material such as Bakelite. The cover or front part 12 of the housing is preferably made of a plastic material such as clear polycarbonate plastic. These materials are extremely durable and resistant to scratching and breaking. They will resist such forces as the impact of a hammer or other tool without serious damage. Furthermore, these materials are highly corrosion resistant and may be subjected to such conditions as sea water, sea water spray, sun light, hot summer and cold winter temperatures, and the like, without deterioration or destruction. Gaskets may be provided between the front and back parts of the housing in order to even further secure the seal therebetween against leakage.

Back part 11 of the housing is provided with upper and lower vents 16, 17, each screwed into a sealed fitting 18 disposed through a hole through the housing wall. Vent 16 is disposed at the upper lefthand side of the housing, as viewed from the front, while vent 17 is disposed at the lower righthand side of the housing. These dispositions of the vents provide for adequate circulation of gases through the housing so that accumulations of hydrogen from the batteries will not accumulate.

Mounted atop the back part 11 of the housing, there are preferably at least two sealed lamps 20, 21 each having a lower pivotal tubular mounting fitting 22 screwed into a sealed fitting 23 disposed through a hole through the upper side of the housing. The electrical conductors 25, 26, 27 providing electric current to the lamps are disposed through the mounting fittings 22, and are completely sealed against exposure and wear.

Electrical supply conductor 30 has end plug 31 suitable for plugging into a socket to provide electrical power to the apparatus. The conductor 30 is shielded between fitting 33 at the point of introduction of the conductor into the housing, and plug 31. The unshielded conductors 30a, 30b extend to box 38. Box 38 contains a battery charger and relay switches which energize the internal circuits of the apparatus. Through conductors 41, 42 the battery or batteries 44 are maintained charged during non-operation of the emergency light apparatus, and through the same conductors energy is supplied from the battery or batteries to the lamps 20, 21 when the main power source is "off" or fails. Box 38 is provided with a "power on" lamp 46 which lights when the main power source is operating, a "fuse" lamp 47 which lights when the protective fuse is inoperative, a "high rate" charge indicator lamp 48, and a test button 50.

When the main power source is operative, a relay switch within box 38 remains open, so that electrical energy from batteries 44 is not conducted to lamps 20, 21. When the main power source fails or is turned off, then this relay closes so that the battery operates the lamps. A battery charger within box 38 is adapted to maintain the batteries fully charged during all times that the main power source is operating, there being a normally closed relay switch connecting the charger to the batteries which is opened when the main power source fails. Conversely, when the main power source has been off, and is returned to operation, the relays operate to reconnect the batteries. Therefore, once the emergency situation has terminated, recharging of the batteries 44 immediately commences.

All the joints and couplings of the apparatus are of completely sealed characteristics. All electrical sockets and fittings are sealed so that there will be no weather or atmospheric penetration into the apparatus, except through vents 16, 17. These vents may be connected by suitable pipes or tubes to any location. For example, if the apparatus is on a ship or boat, the vents 16, 17 may be connected to sheltered locations whereby spray and rain, and the like, will not be introduced into the housing. In any event, even though not so connected, the vents 16, 17 are in the form of downturned ells whereby falling or blown materials, such as dust, water, or the like, will not enter them.

The batteries 44 are subject to variation as to type depending upon the service required. The housing 10 may be altered in size to accommodate larger or smaller batteries or sets of batteries. The batteries are preferably of the nickel-cadmium type and may have sufficient electrolite to operate completely unattended for a period in excess of two years. All battery connections are hermetically sealed.

The subject apparatus is advantageous over other apparatuses designed for the same type of service. Other apparatus known in the art have unprotected ventilation openings in the housings to prevent hydrogen accumulation therewithin. The housings of other known units are opaque overall, whereby observations of the batteries and electrical connections is not possible without opening or removal of the cover.

In the subject apparatus, the test switch button 50 is of extended length, and extends through a sealed opening through the front part 12 of the housing, so that it may be operated without opening the housing. Depression of button 50 causes disconnection of the main power supply, so that conditions are made as though the main power supply had been turned off or had failed. Therefore, when button 50 is depressed the first time, the batteries 44 commence operating the lights 20, 21, and the charger is disconnected. Another depression of the test button causes reconnection as before, with the charger charging the batteries and with the lamps off.

The apparatus has a number of operational advantages. The batteries and box 38 containing the electrical components are completely observable from the exterior of the apparatus. If deterioration of the batteries should occur, this may be observed without opening the housing. Operation of the test button may be made without opening of the housing. In fact, the apparatus may be put into service and left for years without any opening of the housing ever being necessary. The only time when the housing need be opened is when the battery life has expired, and replacement or reconditioning of the batteries is necessary.

The batteries are supported by a bracket 52 which is screwed to the back wall of the housing part 11. Straps 53 having their ends also connected by screws to the back wall of housing part 11, are used for holding the batteries securely in place upon bracket 52. Yet, the batteries may be quickly and easily removed by disconnection of the straps, after the front cover has been removed by disconnection of the quick turn screws 14.

Units of any operating capacity may be provided, within the limitations of battery operation after the batteries have been placed in use during an emergency. Units having 3, 4, or 6 hour life may be provided. The apparatus herein provided exceeds the requirements of Class 1, Division II, of the Federal Occupational Safety and Hazard Act currently in use.

While a preferred embodiment of the apparatus has been described and shown in the drawings, many modifications thereof may be made by a person skilled in the art without departing from the spirit of the invention, and it is intended to protect by Letters Patent all forms of the invention falling within the scope of the following claims.

We claim:

1. Emergency light apparatus, comprising a closed weatherproof housing comprising a back part and a transparent front cover part releasably sealed therewith and having lamp means mounted at its exterior, said back part of said housing being formed of durable shock-resistant plastic, said front cover part of said housing being formed of durable shock-resistant transparent plastic, said front cover part and said back part of said housing being releasably connected together by quick-release bolt means, battery means and battery charger means disposed within said housing, electrical conductor means including first relay switch means connecting said battery charger means to said battery means, electrical conductor means including second relay switch means connecting said battery means to said lamp means, electrical conductor means connecting said battery charger means to an electrical power source, said first relay switch means being closed and said second relay switch means being open when said power source is operative, and said first relay switch means being open and said second relay switch means are closed when said power source is inoperative, whereby said lamp means is energized and lighted when said power source becomes inoperative, said battery means and said battery charger means and said first and second relay switch means being mounted within said back part of said housing and being viewable through said transparent front cover part of said housing, said housing including vent means at the upper part of one end and vent means at the lower part of the opposite end to prevent buildup of hydrogen gas emanating from said battery means with said housing.

2. The combination of claim 1, said lamp means comprising at least two lamps each connected to said battery means to operate independently of other of said lamps.

3. The combination of claim 2, said battery means comprising multicell nickle-cadmium battery sets capable of operating said lamp means for a period of time up to six hours upon inoperativeness of said power source.

4. The combination of claim 3, the electrical connection of said apparatus being hermetically sealed.

5. The combination of claim 4, said apparatus including test switch means for shutting off said power source to simulate inoperativeness thereof.

6. The combination of claim 5, said test switch means having operating means extending sealedly through said front cover part of said housing, whereby the operation of said emergency light apparatus may be tested without opening of said housing.

* * * * *